Patented July 5, 1938

2,122,789

UNITED STATES PATENT OFFICE 2,122,789

DEHYDROGENATION OF GASEOUS PARAFFINS

Hans Tropsch, Chicago, Ill., assignor to Universal Oil Products Company, Chicago, Ill., a corporation of Delaware No Drawing. Application July 12, 1935, Serial No. 31,104

10 Claims. (Cl. 260—170)

This invention relates to the treatment of paraffin hydrocarbons which are normally gaseous including ethane, propane and the butanes.

In a more specific sense the invention is concerned with a process for converting these low boiling members of the paraffin series of hydrocarbons into their corresponding olefins which contain two atoms of hydrogen less per molecule and consequently have one double bond between carbon atoms.

There is a large commercial production of gaseous paraffin hydrocarbons. They occur in very large quantities in natural gas, particularly those gases associated with the production of crude oil and commonly known as casing head gases and this supply is further augmented by the gases produced in cracking oils for the production of gasoline although this latter type of pyrolytically produced gas contains substantial quantities of olefins as well as paraffinic hydrocarbons.

The greater part of the paraffin gas production is used merely for domestic and industrial fuel purposes and not as a source of hydrocarbon derivatives on account of the unreactive character of its components in comparison with their olefinic counterparts.

In one embodiment, the invention comprises the dehydrogenation of gaseous paraffin hydrocarbons at elevated temperatures in the presence of catalysts comprising essentially aluminum oxide supporting lead chromate and zinc sulfate as promoters.

In the present instance the catalysts which are preferred for selectively dehydrogenating the lower boiling paraffinic hydrocarbons have been evolved as the result of a large number of experiments with both simple and complex substances having a dehydrogenating action upon various types of hydrocarbons such as are encountered in the fractions produced in the distillation of petroleum and other naturally occurring hydrocarbon oil mixtures. The criterion of an acceptable dehydrogenating catalyst is that it shall split off hydrogen without inducing either carbon separation or scission of the bonds between carbon atoms.

In the concept of the present invention, catalyst mixtures comprising major amounts of aluminum oxide and minor amounts of lead chromate and zinc sulfate have been found to be particularly valuable and efficient. The combined amounts of lead chromate and zinc sulfate will rarely exceed 5% by weight of the aluminum used in preparing catalysts for the present process. While aluminum oxide alone is a fairly good dehydrogenating catalyst in the above sense, the tendency to selective splitting off of hydrogen on the one hand has been found to be increased, while the tendency to carbon splitting on the other hand has been found to be decreased by the use of the two compounds mentioned so that the overall dehydrogenating action is rendered more definite and effective.

Aluminum oxide itself prepared by the controlled calcination of natural carbonate and hydrate ores, or by chemical precipitation methods is in itself a fairly good catalyst for accelerating the rate of dehydrogenation of gaseous paraffins over a considerable temperature range. However, an extensive series of experiments has demonstrated that this catalytic property is greatly improved by the addition of promoting substances in minor amounts, usually of the order of less than 10% by weight of the oxide.

Aluminum oxide to be used as a base material for the manufacture of catalysts for the process may be obtained from natural oxide minerals or ores such as bauxite or carbonates such as dawsonite by proper calcination or it may be prepared by precipitation of aluminum hydrate from solutions of aluminum sulphate or different alums, the precipitate of aluminum hydroxide being dehydrated by heat, and usually it is both desirable and advantageous to further treat it with air or other gases or by other means to activate it prior to use.

Two hydrated oxides of aluminum occur in nature, to wit; bauxite having the formula $Al_2O_3.2H_2O$ and Diaspore with the formula $Al_2O_3.H_2O$. In both of these oxides iron sesquioxide may partially replace the aluminum. These two minerals or corresponding oxides produced from precipitated and suitably activated aluminum hydrate are adaptable for the manufacture of the present type of catalysts and in some instances have given the best results of any of the compounds whose use is at present contemplated. The mineral dawsonite having the formula $Na_3Al(CO_3)_3.2Al(OH)_3$ is another mineral which may be used as a source of aluminum oxide.

According to the present invention the preferred promoting substances to be used for improving the catalytic effectiveness of aluminum oxide in selectively dehydrogenating gaseous paraffins are lead chromate either alone or, preferably, in combination with zinc sulfate, since extensive experiments have shown that the combined use of these two chemical compounds exerts a particularly good promoting effect. The reason for the particular value of these two compounds is not entirely explainable on the basis of chemical theory any more than is the effectiveness of other catalysts which have been found empirically to promote specific reactions. However, it appears that, when the two salts are used jointly, the extension of the life of the catalyst mass is quite pronounced, since the presence of the lead chromate causes increased activity in the early stages of use and assists the catalysts to reach its greatest effectiveness in a shorter time while the zinc sulfate begins to act more slowly and makes up for the gradual loss in efficiency of the other salt. It may be said, therefore, that the lead chromate acts in the early stages of use and the zinc sulfate in the later stages.

The preparation of active alumina as base material for the present type of composite catalysts involves generally the controlled calcination of aluminum hydrate obtained from various primary sources such as, for example, natural minerals or chemical precipitates. The conditions of time and temperature employed in calcining any particular mineral or precipitated material will depend, to a large extent, upon its physical and, to a smaller extent, upon its chemical composition. Aluminum ores may contain at times several percent of ferric oxide in isomorphous mixtures with aluminum oxide and since it may occur in nature in harder and more compact varieties than the precipitated materials, it may require different conditions of time and temperature to reduce substantially all of it to the desired oxide. In preparing the promoted catalysts carefully calcined aluminum oxide is first ground to produce granules of relatively small mesh and these are then given the requisite amounts of the promoter compounds by successive precipitation and absorption from aqueous solutions of salts. The aluminum oxide resulting from a regulated calcination has a high absorptive capacity for activating materials and readily takes up the required percentages when they are precipitated from or dissolved in aqueous solutions. To insure complete absorption of salts from the solutions and at the same time a uniform distribution upon the aluminum oxide granules, the latter may be added to relatively dilute solutions of salts and these may then be concentrated until a critical point is reached corresponding to complete removal of dissolved material. At this point the solvent may be removed by filtering or pressing or evaporation by heat. More of the preferred details of procedure will be explained in a later example. The exact method of adding the two joint promoters to the aluminum oxide is not a special feature of the present invention and any mode of operation which suggests itself to persons conversant with such catalyst preparation and ordinary chemical processes may be used. As a rule, however, the best materials are made by successively applying the lead chromate and the zinc sulfate. Reversing the order of deposition upon the aluminum oxide granules produces catalysts of inferior value.

In practicing the dehydrogenation of paraffinic gases according to the present process a solid composite catalyst comprising aluminum oxide with lead chromate and zinc sulfate deposited thereon and prepared according to the foregoing alternative methods is used as a filler in a reaction tube or chamber in the form of particles of graded size or small pellets and the gas to be dehydrogenated is passed through the catalyst after being heated to the proper temperature, usually within the range of 400 to 750° C. (752 to 1382° F.) The most commonly used temperatures are above 550° C. (1022° F.) though in general a temperature range of from 900 to 1050° F. is practical. The catalyst tube may be heated exteriorly if desired to maintain the proper reaction temperature. The pressure employed may be atmospheric or slightly superatmospheric of the order of from 50 to 100 pounds per square inch, though any large amount of pressure has a tendency to depress the dehydrogenation reactions disproportionately to the increase in capacity of the plant. The time during which the gases are exposed to dehydrogenating conditions in the presence of the preferred catalyst is comparatively short, always below 20 seconds and frequently as low as from 3 to 6 seconds.

The exit gases from the tube or chamber may be passed through selective absorbents to combine with or absorb the olefin or olefin mixture produced or the olefins may be selectively polymerized by suitable catalysts, caused to alkylate other hydrocarbons such as aromatics or treated directly with chemical reagents to produce desirable or commercially valuable derivatives. After the olefins have been removed the residual gases may be recycled for further dehydrogenating treatment with or without removal of hydrogen.

Members of the present group of catalysts are selective in removing two hydrogen atoms from a paraffin molecule to produce the corresponding olefin without furthering to any great degree undesirable side reactions, and because of this show an unusually long period of activity in service as will be shown in later examples. When, however, their activity begins to diminish it is readily regenerated by the simple expedient of oxidizing with air or other oxidizing gas at a moderately elevated temperature, usually within the range employed in the dehydrogenating reactions. This oxidation effectively removes traces of carbon deposits which contaminate the surface of the particles and decrease their efficiency. It is characteristic of the present types of catalysts that they may be repeatedly regenerated without loss of porosity or catalyzing efficiency.

Numerous experimental data could be adduced to indicate the results obtainable by employing the present type of catalyst to dehydrogenate paraffins but the following single example is sufficiently characteristic, though it is not given with the intent of limiting the scope of the invention correspondingly.

In making the catalyst, one hundred grams of granular aluminum oxide was treated with 200 parts by weight of a 5.0% potassium dichromate solution at the boiling point for one-half an hour. The liquid was then filtered off and the alumina base was dried at 300° C. (572° F.). After drying, the alumina particles were treated with 200 parts by weight of a 7.5% lead acetate solution at the boiling point for one-half an hour. After filtering off the liquid the catalyst was washed thoroughly with distilled water and then dried at 300° C. (572° F.). Seventy-five parts by weight of this preparation was treated with 150 parts by weight of a 25% zinc sulfate solution for one-half an hour at the boiling point of the solution. The liquid was then filtered off and the catalyst was dried for several hours at 300° C. (572° F.) and finally at 600° C. (1112° F.) for one hour.

This catalyst was used at 600° C. and gave, at atmospheric pressure with a feed rate of 1 part by weight of isobutane per 6 parts by weight of catalyst per hour, a gas having the following analysis:

| | Per cent by volume |
|---|---|
| Hydrogen | 36.9 |
| Methane | 13.0 |
| Ethylene | 1.1 |
| Ethane | 3.7 |
| Propylene | 9.1 |
| i-Butylene | 20.7 |
| n-Butylene | 2.4 |
| Butanes | 12.3 |

Since an expansion of 2.03 was observed at the time the sample was taken, the following yields of iso-butylene and other olefins were obtained:

| | Percent yield based on i-butane charged | Percent yield based on i-butane decomposed |
|---|---|---|
| Iso-butylene | 41.4 | 55.7 |
| Other olefins | 7.1 | 9.4 |

The foregoing specification and example are sufficient to show that the invention has intrinsic value when practiced in the art, but neither is to be construed as imposing limitations upon the scope of the invention, as both are given for illustrative purposes only.

I claim as my invention:

1. A process for the dehydrogenation of normally gaseous paraffin hydrocarbons to produce olefin hydrocarbons, which comprises subjecting said paraffin hydrocarbons under dehydrogenating conditions to the action of a catalyst comprising essentially aluminum oxide and a promoter catalyst comprising essentially lead chromate and containing deposited thereon zinc sulfate.

2. A process for the dehydrogenation of normally gaseous paraffin hydrocarbons to produce olefin hydrocarbons, which comprises subjecting said paraffin hydrocarbons under dehydrogenating conditions to the action of a catalyst comprising essentially aluminum oxide and a promoter catalyst comprising essentially lead chromate.

3. A process for the dehydrogenation of normally gaseous paraffin hydrocarbons to produce olefin hydrocarbons which comprises subjecting said paraffin hydrocarbons under dehydrogenating conditions to the action of a catalyst comprising essentially aluminum oxide supporting successive additions of lead chromate and zinc sulfate as promoters.

4. A process for the dehydrogenation of normally gaseous paraffin hydrocarbons to produce olefin hydrocarbons, which comprises subjecting said paraffin hydrocarbons to the action of a catalyst comprising essentially aluminum oxide, a promoter catalyst comprising essentially lead chromate, and containing deposited thereon zinc sulfate, at a temperature of from 750 to 1380° F. and for a time period of from 3 to 20 seconds.

5. A process for producing olefins from paraffin hydrocarbons which comprises subjecting the paraffins under dehydrogenating conditions to the action of an aluminum oxide catalyst containing lead chromate in minor proportion.

6. A process for producing olefins from paraffin hydrocarbons which comprises subjecting the paraffins under dehydrogenating conditions to the action of an aluminum oxide catalyst containing minor proportions of lead chromate and zinc sulphate.

7. A process for producing olefins from normally gaseous paraffin hydrocarbons which comprises subjecting the paraffins under dehydrogenating conditions to the action of an aluminum oxide catalyst containing lead chromate in minor proportion.

8. A process for producing olefins from normally gaseous paraffin hydrocarbons which comprises subjecting the paraffins under dehydrogenating conditions to the action of an aluminum oxide catalyst containing minor proportions of lead chromate and zinc sulphate.

9. A catalyst suitable for converting paraffins into olefins comprising a mixture of a major proportion of aluminum oxide and a minor proportion of lead chromate.

10. A catalyst suitable for converting paraffins into olefins comprising a mixture of a major proportion of aluminum oxide and minor proportions of lead chromate and zinc sulphate.

HANS TROPSCH.